United States Patent Office 3,829,500
Patented Aug. 13, 1974

3,829,500
OXYBIS(BENZENESULFONYLPOLYALKOXYAL-KANOLS) AND THEIR USE AS SURFACTANTS
Richard P. Crowley, Wellesley, Mass.
(125 High St., Boston, Mass. 02110)
No Drawing. Filed May 24, 1972, Ser. No. 256,280
Int. Cl. C07c 147/06, 147/10
U.S. Cl. 260—607 A          5 Claims

ABSTRACT OF THE DISCLOSURE

An oxybis(benzenesulfonyl polyether) compound represented by the formula:

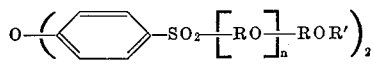

wherein R is a $C_2$–$C_{16}$ alkylidene radical, R' is a halide radical or hydrogen, and $n$ is 2 to 100.

BACKGROUND OF THE INVENTION

Oxybis(benzenesulfonyl hydrazide) is a commercially produced product employed as a blowing agent, particularly in synthetic elastomers, for the production of cellular products (see U.S. Pat. 2,626,933 and U.S. Pat. 2,552,-065). This blowing agent is prepared by reacting oxybis(benzenesulfonyl chloride) with hydrazine. The intermediate product, oxybis(benzenesulfonyl chloride), is typically prepared by reacting diphenyl oxide with chlorosulfonic acid, the reaction proceeding first to the sulfonic acid and then to the chlorosulfonic acid stage. The compound produced is a stable, but reactive, intermediate compound for the preparation of the blowing agent.

There are a number of ethoxylated phenolic compounds which are surface-active agents or emulsifiers useful, for example, in aqueous systems, such as polymeric latices, such as styrenebutadiene rubber and the like. Typical phenolic compounds which act as emulsifiers and surface-active agents include the ethoxylated-type phenols, such as the alkylphenoxypolyethoxyethanols. Typical compounds which act as emulsifiers are described in U.S. Pats. 2,504,064; 2,598,234; 2,930,778; 3,064,057; and 3,100,230. There presently exists a number of surface-active agents and wetting agents suitable for a wide variety of applications depending upon the hydrophilic/hydrophobic balance and the particular use to which the agent is employed. Typical nonionic surfactants would include the alkylaryl ether alcohols, as well as the alkylaryl polyether alcohols, while the anionic-type surfactants would include the sodium alkylaryl polyether sulfonates, as well as the sodium alkyl sulfo succinates, such as the dioctyl sodium sulfo succinates. Such surfactants, wetting agents, and surface-active agents are employed, for example, in preparing foamable latex compositions, as well as in carrying emulsification polymerization reactions.

SUMMARY OF THE INVENTION

My invention concerns a novel class of water-soluble oxybis(benzenesulfonyl) compounds, the method of preparing such compounds, and the use of such compounds as surface-active agents. In particular, my invention relates to oxybis(benzenesulfonyl polyalkoxy ether) compounds, and more particularly, the oxybis(benzenesulfonylpolyethoxy and propoxy ethanols and propanols) and the oxybis(benzenesulfonylpolyethoxy and polypropoxy ethyl and propyl ether halides), such as the chloro derivatives.

The novel oxybis(benzenesulfonyl polyether) compounds of my invention are prepared by reacting an oxybis(benzenesulfonyl) compound, such as the halide, or the sulfonic acid or other compounds, with an alkylene oxide in a ring-opening reaction to provide the corresponding water-soluble alkylene oxide derivative of the oxybis(benzenesulfonyl) compound, which compound is useful as a surfactant and wetting agent. For example, in one embodiment of my invention, the oxybis(benzenesulfonyl halide), such as the chloride, may be reacted with an alkylene oxide, such as the ethylene oxide, to provide the corresponding polyethoxy derivative, while in another embodiment, the oxybis(benzenesulfonic acid) compound may be reacted with an alkylene oxide, such as ethylene oxide, to produce the corresponding oxybis(benzenesulfonyl) polyethoxyethanol.

The oxybis(benzenesulfonyl polyether) compounds of my invention may be represented by the formula:

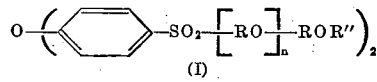
(I)

wherein $n$ may represent a number from 2 to 100, such as 5 to 50, more particularly, 10 to 30; R is an alkylidene radical; e.g., a $C_2$–$C_{16}$ radical derived from the reaction of the oxybis(benzenesulfonyl) compound with an alkylene oxide, such as a $C_2$–$C_4$ alkylene radical or a phenyl-substituted $C_2$–$C_4$ alkylene radical, and particularly, where R is a $C_2$–$C_3$ radical; and R' represents a halide radical, such as a fluoride, chloride, bromide or iodide, and particularly, a chloride, or hydrogen, to form the corresponding alkanol from the alkylene oxide employed in the reaction or the corresponding halide-substituted alkylene oxide where the starting material is an oxybis(benzenesulfonyl halide).

In one preferred embodiment of my invention, the class of oxybis(benzenesulfonyl polyether) compounds comprises an oxybis(benzenesulfonyl polyethoxyethanol or polyethoxyethyl chloride) as represented by Formulas (II) and (III):

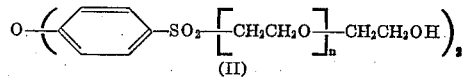
(II)

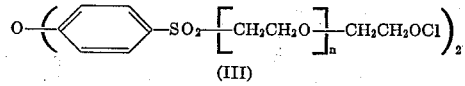
(III)

The novel class of compounds of my invention are prepared by reacting the oxybis(benzenesulfonyl acidic) compounds, such as the acid or halide or halide compounds, in bulk or in solution, such as an organic solvent, such as toluene, xylene, ethanol or other anhydrous or substantially anhydrous solutions, such as alcohol or other organic solvent solutions, with the appropriate alkylene oxide. The alkylene oxide, such as ethylene oxide, may also be reacted under pressure from one to ten atmospheres in a pressure bomb with the compound, or preferably, by introducing the gaseous alkylene oxide directly into a solution containing the oxybis(benzenesulfonyl) compound. Typically, the reaction may be carried out from about 10 to 50° C.; for example, 20 to 40° C. The amount of alkylene oxide to be employed depends upon the desired water-soluble and other properties of the resulting compounds. My oxybis(benzenesulfonyl polyether) compounds are particularly useful as wetting agents, surfactants and surface-active agents and detergent in aqueous systems due to the greatly increased water solubility from both the polyether groups and the sulfonyl groups in the molecule. In addition, the sulfonyl groups impart a temperature stability to the resulting products. Accordingly, my compounds may be employed as emulsifiers and the like drilling muds, cutting oils and in other aqueous compositions subject to elevated temperatures where other agents may be subject to temperature degradation.

A number of alkylene oxides may be employed in the preparation of the compounds of my invention. More typical oxides would include ethylene oxide, propylene oxide, butylene oxide, styrene oxide, as well as straight-chain alpha olefinic epoxides, such as the $C_8$-$C_{16}$, particularly the $C_{14}$-$C_{16}$ alpha olefinic epoxides which provide for highly reacted terminal groups which would exhibit typical epoxide-opening reactions with the oxybis(benzenesulfonyl), but also providing a long-chain linear hydrocarbon to impart oil solubility to portions of the molecule, as well as substituted epoxides, such as epichlorhydrin.

Further, in another embodiment of my invention, it is recognized that the oxybis(benzenesulfonyl) compounds, such as the acid or the halides, may be reacted with imines, such as ethylene imine, in either a ring-opening-type reaction or a ring-preserving-type reaction where the ethylene similar to those undergone by the reaction of ethylene oxide with the oxybis(benzenesulfonyl) compounds, the resulting compound is a water-soluble polyimine having polyethylene imine groups therein, while in the ring-preserving reaction, ethylene imine has the hydrogen atom on the nitrogen and can be placed in various ways, or it may form salts or metal complexes, thereby providing an oxybis(benzenesulfonyl) having the nitrogen attached to the sulfur atoms of the sulfonyl group. Such compounds may be employed as water-soluble emulsifiers and the like. Ethylene imine is the preferred imine; however, other alkyl ethylene imine compounds may be employed to include N-alkyl ethylene imine, such as the $C_2$-$C_4$ alkyl ethylene imines to include N-methylethylene imine, 2-methylethylene imine, N-ethyethylene imine, 2-ethylethylene imine, 2,2-dimethylethylene imine and N-tertiary butyl ethylene imine and the like. Typically, reactions are carried out in the presence of an acid, such as hydrochloric acid or acid-type catalysts with the reaction, as with ethylene oxide, being exothermic, the resulting reaction product of both the ethylene imine and alkylene imines being more water-soluble than the product from which it is derived.

Furthermore, in another embodiment of my invention, the alkylene oxides may be reacted with oxybis(benzenesulfonyl amine) compounds where the nitrogen bonded to the sulfur atom contains one or two hydrogen atoms, and wherein the alkylene oxide substitutes one or more of the hydrogens on the nitrogen atom to provide the water-soluble polyether alkanol compounds. The oxybis(benzenesulfonyl amine) compound may be an N-substituted amide, such as a $C_1$-$C_4$ alkyl-substituted, such as the methyl or ethyl, propyl or tertiary butyl N-alkyl-substituted sulfonyl amide.

DESCRIPTION OF THE PREFERRED EMBODIMENTS

The novel compounds of my invention are most conveniently made by reacting diphenyl ether with an acid or acid halide like chlorosulfonic acid in a manner to give the corresponding sulfonic acid or sulfonyl chloride, which is isolated or purified in any suitable manner. This compound is then subsequently reacted with the alkylene oxide, such as ethylene oxide, to provide the new compounds of my invention. The reaction can be effected by simply combining the two reactants at a suitable temperature; however, preferably, the reaction is carried out in a nonreactive liquid medium, such as an organic solvent, such as ethanol, methanol, dioxane, toluene, xylol, methylethyl ketone, and the like. The amount of alkylene oxide employed is selected to insure the desired number of polyalkoxy groups in the resulting molecule. The water-soluble compounds of my invention are easily separated or recovered from the solvent through water-extraction procedures, evaporation or in a similar manner.

Example 1

Oxybis(benzenesulfonylpolyethoxyethanol) is prepared by reacting oxybis(benzenesulfonic acid) (obtained by the reaction of chlorosulfonic acid or sulfonic acid with a diphenyl ether) with about 1 mole of the product reacted with 10 to 20 moles of ethylene oxide in the presence of anhydrous ethyl alcohol as the liquid reaction medium. The ethylene oxide is sparged into the solution containing the oxybis(benzenesulfonic acid), the reaction permitted to go to completion at room temperature (25° C.). After the completion of the reaction, the product is recovered by evaporation of the solvent and then is washed with ethyl alcohol. The resulting product is a water-soluble solid product. This product may be employed as an emulsifier; e.g., in styrene-butadiene latex systems in an amount of 0.1 to 2.0 percent by weight.

Example 2

Oxybis(benzenesulfonylpolyethoxyethanol chloride) is prepared by dissolving about 1 mole of oxybis(benzenesulfonyl chloride) in approximately 2,000 mls. of toluene solution, and, thereafter, about 25 moles of ethylene oxide in gaseous form is introduced into the liquid reaction mixture through a sparger. The resulting water-soluble product: (1) precipitates from the reaction mixture; (2) is removed by filtering; and (3) is washed with ethyl alcohol to provide a water-soluble product useful as an emulsifier in preparing a cutting oil emulsion.

What I claim is:

1. An oxybis(benzenesulfonyl polyether) compound represented by the formula:

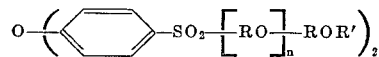

wherein R is a $C_2$-$C_{16}$ alkylidene radical, R' is hydrogen, and $n$ is 2 to 100.

2. The compound of claim 1 wherein the alkylidene radical is a $C_2$-$C_3$ radical.

3. The compound of claim 1 wherein $n$ is 10 to 40.

4. The compound of claim 1 which is oxybis(benzenesulfonylpolyethoxyethanol).

5. The compound of claim 1 which is oxybis(benzenesulfonyl polypropoxy propanol).

References Cited

UNITED STATES PATENTS 3,522,210    7/1970    Sellers et al. _____ 260—47

LEWIS GOTTS, Primary Examiner

D. R. PHILLIPS, Assistant Examiner

U.S. Cl. X.R.

260—29.6 M, 29.7, 453 R, 570.7